(No Model.)

G. S. BURRELL.
CARPET PROTECTOR.

No. 402,504. Patented Apr. 30, 1889.

WITNESSES.
H. D. Nealy.
C. P. Bailey.

INVENTOR.
Geo. S. Burrell,
BY HIS ATTORNEY.
C. P. Jacobs.

UNITED STATES PATENT OFFICE.

GEORGE S. BURRELL, OF KALAMAZOO, MICHIGAN, ASSIGNOR TO FLETCHER E. MARSH, OF INDIANAPOLIS, INDIANA.

CARPET-PROTECTOR.

SPECIFICATION forming part of Letters Patent No. 402,504, dated April 30, 1889.

Application filed February 11, 1889. Serial No. 299,545. (No model.)

*To all whom it may concern:*

Be it known that I, GEORGE S. BURRELL, of Kalamazoo, county of Kalamazoo, and State of Michigan, have invented certain new and useful Improvements in Carpet-Protectors; and I do hereby declare that the following is a full, clear, and exact description thereof, reference being had to the accompanying drawings, in which like letters refer to like parts.

My invention relates to the construction of devices for protecting carpets from burning when removing ash-pans from ordinary heating-stoves, and will be understood from the following description.

Figure 1:
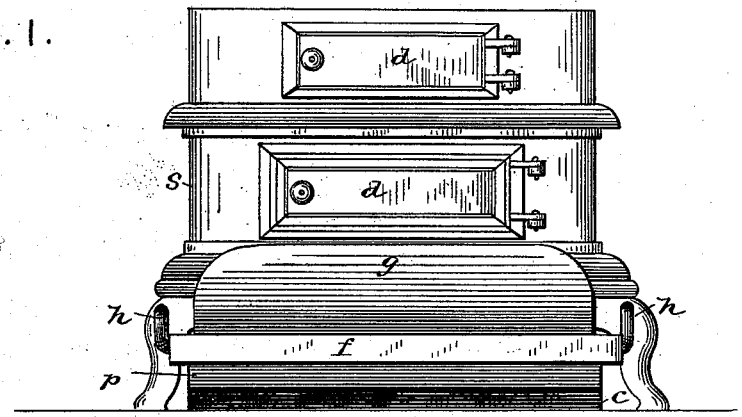
Figure 2:
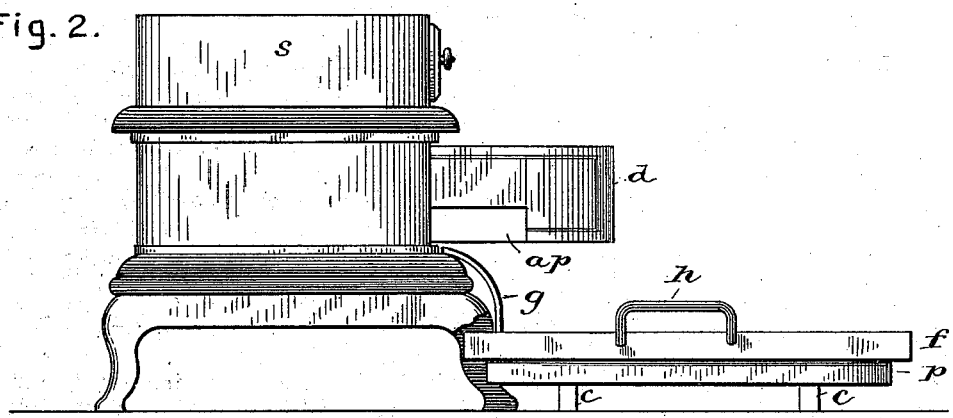
Figure 3:
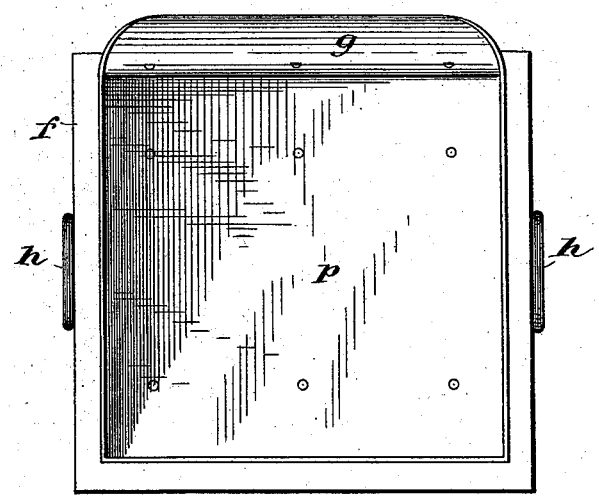

In the drawings, Figure 1 is a front view of my device in position for use. Fig. 2 is a side view of the same, showing the stove-door open and the ash-pan partly drawn. Fig. 3 is a top view of my device.

In detail my device consists of a pan, $p$, formed of zinc, surrounded by a frame-work, $f$, having a curved front or guard, $g$. At the side are handles $h$ and upon the bottom are cleats $c$, for lifting the protector above the floor and preventing the heated metal from scorching or charring the carpet.

The device may be used with or without the handles; but the latter are preferable.

The device is intended to operate as follows: It is placed in position in front of the stove, as shown in Fig. 1, the curved guard coming up directly beneath the pan, and when the door $d$ is opened and the ash-pan $ap$ is drawn out it may be set directly in the pan $p$ and carried out; or the surplus ashes may be gathered up into the pan, or any coals or lumps likely to fall from the ash-pan may be shaken off therein, thus saving the carpet from injury.

The device may be made in any shape suitable to conform to the shape of the stove, and if the latter is circular the guide $g$ will also be circular, so as to fit closely about the base of the stove.

What I claim as my invention, and desire to secure by Letters Patent, is the following:

1. The pan $p$, provided with curved front piece, $g$, substantially as shown and described.

2. The pan $p$, having the curved front piece, $g$, connected with the frame-work $f$, and having handles $h$ at the sides of such frame, substantially as shown and described.

3. The pan $p$, having curved front piece, $g$, the frame-work $f$, surrounding the pan, handles $h$, also connected to such frame, and cleats $c$ beneath the bottom of the pan, all combined substantially as shown and described.

In witness whereof I have hereunto set my hand this 29th day of January, 1889.

GEORGE S. BURRELL.

Witnesses:
 T. F. GIDDINGS,
 D. E. GROESBECK.